(12) United States Patent
Gerwin

(10) Patent No.: US 8,667,393 B2
(45) Date of Patent: Mar. 4, 2014

(54) SYSTEM AND METHOD FOR PROVIDING SUPPLEMENTAL CONTENT RELATED TO PRINTED CONTENT IN A PRINTED PUBLICATION

(75) Inventor: Nina Gerwin, Fairfax, CA (US)

(73) Assignee: The Eye Capture Company, Inc., San Anselmo, CA (US)

( * ) Notice: Subject to any disclaimer, the term of this patent is extended or adjusted under 35 U.S.C. 154(b) by 87 days.

(21) Appl. No.: 13/198,508

(22) Filed: Aug. 4, 2011

(65) Prior Publication Data

US 2013/0036362 A1    Feb. 7, 2013

(51) Int. Cl.
*G06F 17/27* (2006.01)

(52) U.S. Cl.
USPC ........................................... 715/273

(58) Field of Classification Search
USPC ........................................... 715/273
See application file for complete search history.

(56) References Cited

U.S. PATENT DOCUMENTS

| | | |
|---|---|---|
| 6,108,656 A | 8/2000 | Durst et al. |
| 7,314,178 B2 | 1/2008 | Rines et al. |
| 7,590,259 B2 | 9/2009 | Levy et al. |
| 7,793,230 B2 | 9/2010 | Burns et al. .................. 715/787 |
| 7,899,252 B2 | 3/2011 | Boncyk et al. |
| 8,095,546 B1 | 1/2012 | Baluja et al. .................. 707/750 |
| 2002/0002563 A1 | 1/2002 | Bendik ......................... 707/500 |
| 2005/0162523 A1 | 7/2005 | Darrell et al. |
| 2005/0261990 A1 | 11/2005 | Gocht et al. ..................... 705/27 |
| 2007/0299936 A1 | 12/2007 | Borgendale et al. ........... 709/219 |
| 2008/0082903 A1* | 4/2008 | McCurdy et al. .............. 715/200 |
| 2010/0103241 A1 | 4/2010 | Linaker ...................... 348/14.02 |
| 2011/0035662 A1* | 2/2011 | King et al. ..................... 715/273 |
| 2013/0024470 A1 | 1/2013 | Gerwin ......................... 707/769 |

* cited by examiner

*Primary Examiner* — Laurie Ries
*Assistant Examiner* — Tionna Smith
(74) *Attorney, Agent, or Firm* — Pillsbury Winthrop Shaw Pittman LLP

(57) ABSTRACT

A system for providing supplemental content, e.g. purchase information and/or URLs, to a user includes a server and client computing platforms. The supplemental content is related to printed content from a printed publication, such as a magazine. A specific set of printed content, such as a page in a magazine, may include multiple content items that may be of particular interest to the user. The user requests the supplemental content regarding a specific content item by selecting a user-selectable field, e.g. presented via a display of a client computing platform, that corresponds to the specific content item.

27 Claims, 5 Drawing Sheets

SYSTEM AND METHOD FOR PROVIDING SUPPLEMENTAL CONTENT RELATED TO PRINTED CONTENT IN A PRINTED PUBLICATION

RELATED APPLICATIONS

This application is related to U.S. patent application Ser. No. 13/189,317, entitled "System And Method For Providing Electronic Supplemental Content Associated With Printed Content In A Printed Publication," and filed Jul. 22, 2011. All of the related applications are hereby incorporated by reference into the present application in their entirety.

FIELD OF THE INVENTION

The invention relates to presenting supplemental content related to printed content within a printed publication. The printed content may include commercially available goods and/or services, among other content. The supplemental content may include electronic information regarding the content, particularly regarding the goods and/or services. The electronic information may be presented to a user to initiate, facilitate, and/or complete a transaction that involves the user, such as a commercial transaction in which the user purchases some commercially available good and/or service.

BACKGROUND OF THE INVENTION

Print magazines have been eager to find a way to present supplemental electronic content to users, in addition to their printed content. Conventional techniques may rely on machine-readable markers associated with specific sets of content (e.g., a page, an ad, a specific story or article, and/or other sets of content) to identify printed content and access supplemental electronic content. Other conventional techniques may rely on online supplemental content that is organized and/or indexed such that a user may successfully search for supplemental electronic content that is related with specific sets of content in a printed publication. For example, a print magazine may have an electronic online counterpart, such as a web magazine, access to which may e.g. be available to subscribers of the print magazine.

A variety of products exists that recognize images, such as used in printed content, and then direct users to internet search results associated with a recognized image. These systems tend to only identify images, not specific publications or content therein, and to indiscriminately provide search results regardless of the context in which the image appears.

SUMMARY

One aspect of the invention relates to a system and/or method to provide supplemental content to a user. The supplemental content may be related to printed content from a printed publication. A specific set of printed content may include multiple content items that may be of interest to obtain supplemental information about. A user may request supplemental content regarding a particular content item by selecting a user-selectable field that corresponds to the particular content item.

A system configured to provide supplemental content to the user may include one or more servers, one or more client computing platforms (which may include a supplemental content client), and/or other components. The server may be administered and/or hosted by an administrator and/or through an administrator network. The server may be configured to serve information to the client computing platforms, in particular to the user's supplemental content client, according to a client/server architecture, and/or any other appropriate architecture. Via the supplemental content client a user may be presented with information, i.e. supplemental content, related to specific printed content.

A supplemental content client may include an electronic display, an interface capable of receiving a selection from a user, an electronic connection to one or more servers and/or online content providers, one or more processors, and/or other components. The one or more processors may be configured to execute one or more of an identifier transmission module, a representation module, an interface module, a supplemental request module, a presentation module, and/or other modules.

The identifier transmission module of the supplemental content client may be configured to transmit an itemized content request for itemized content corresponding to a specific set of printed content. The itemized content request may identify the specific set of printed content (e.g., a page, an ad, a story and/or article, an ad and/or information regarding commercial services and/or goods (which may be offered for sale), and/or other sets of printed content that include multiple content items). The specific set of printed content may include multiple content items, e.g. an article and several ads for commercially available goods and/or services. To identify the set of printed content, the itemized content request may include one or more of an image, a machine-readable marker, a user-supplied identifier, such as a string of characters entered and/or supplied by a user through an appropriate interface, and/or another identification of printed content.

The representation module of the supplemental content client may be configured to obtain itemized representation content, e.g. from a network location. The itemized representation may be provided and/or administered to the supplemental content client, e.g. by an administrator and/or through an administrator network, responsive to the itemized content request being transmitted by the identifier transmission module. The provision of the itemized content may include a direct transmission from the same server the itemized content request was transmitted to (which may be part of the administrator network), may include a transmission from a different server than the server the itemized content request was transmitted to (such as a third-party server), may include a transmission of a network location (such as a URL) at which the requested itemized content may be accessed, and/or other technique for providing content and/or access thereto for the supplemental content client.

The itemized representation content may represent the content items of the specific set of printed content that may be identified by the itemized content request. The itemized representation content may include user-selectable fields such that individual fields correspond to individual content items, and such that a field may be associated with supplemental content that may be related to the corresponding content item. A user-selectable field may include one or more of an image, text, a barcode, audio information, video information, and/or other information. The itemized representation content may be configured as a graphical representation of a specific set of printed content. In other words, the itemized representation content may have a graphical layout, once processed and/or presented, that resembles the graphical layout of the specific set of printed content. The resemblance may pertain to at least one of the commercially available goods and/or services for which information is included in the specific set of printed content, if not all of them. The resemblance may involve one or more of the shape, size, (relative) positioning, layout, (partial) text, (partial) image(s), and/or color of a content item included in the specific set of printed content.

The interface module of the supplemental content client may be configured to present the itemized representation content on the electronic display of the supplemental content client. The interface module may be configured to receive a user-selection of one or more of the user-selectable fields that are included in the itemized representation content. As mentioned before, the presentation of the itemized representation content may have a graphical layout that resembles the graphical layout of the specific set of printed content. The individual user-selectable fields may be associated with individual ones of the items in the printed content. Selection of a user-selectable field may provide access to the supplemental content, e.g. as described below, which may be obtained from a network location that may be referred to as the supplemental content location.

The supplemental request module of the supplemental content client may be configured to transmit a supplemental content request. Operation of the supplemental request module may be responsive to receipt of the user-selection of one or more fields that are included in the itemized representation content, as presented, e.g., by the interface module. The requested supplemental content may be associated with the one or more user-selected fields of the itemized representation content. The supplemental content request may include the supplemental content location, e.g. provided by the interface module. The supplemental content request may be transmitted, e.g., to a server.

Supplemental content may include, for example, information related to advertisers, individuals, entities, goods, and/or services featured in the printed content, video or audio content, a merchant interface through which products can be purchased, and/or other supplemental content.

The presentation module of the supplemental content client may be configured to obtain, receive, and/or present the requested supplemental content on the electronic display of the supplemental content client. The supplemental content may be associated with the selected user-selectable field. The supplemental content may be curated and/or hosted by a supplemental network that may be outside of influence and/or control by either a supplemental content client or the server the itemized content request was transmitted to (which may be part of the administrator network). Such a supplemental network may be referred to as a third-party network. For example, the supplemental content may include product and/or service information that is controlled by a publisher (e.g., the publisher that published the printed publication), a store and/or company aiming to sell that product and/or service, or under control of another provider of online content. The supplemental content for a particular content item may include a link, such as a URL, to an online store/marketplace (i.e. a third-party network) where a user might find additional (purchase) information regarding the particular content item. In some implementations, the supplemental content related to a content item may be dynamically adjustable by the third-party network. For example, the same user-selection may lead to a first instance of supplemental content at a first moment in time, and to a second instance of supplemental content at a later moment in time occurring after the first moment in time. The relation itself, rather than merely the supplemental content, may be curated and/or hosted by a third-party network for one or more of the content items. In some implementations, the administrator network may relinquish control over a relation between supplemental content and a content item to a third-party network for a period of time.

Subsequent to transmission of the supplemental content request (by the supplemental request module), the presentation module may receive transmission of and/or access to the requested supplemental content. The transmission and/or obtainment of the requested supplemental content may provide the supplemental content client with access to the requested supplemental content for presentation to the user.

The presentation module of the supplemental content client may be configured to process the supplemental content for presentation on the electronic display, before presenting it to the user. Processing may be performed to account for particular characteristics of the current supplemental content client, such as type of platform, operating system version, software version, hardware version, size and/or resolution of the electronic display, available colors and/or fonts on the supplemental content client, and/or other characteristics of the current supplemental content client that may affect the graphical presentation of information to a user. Alternatively, and/or simultaneously, processing may be performed in accordance with customization settings, user settings, user preferences, user account information, and/or other information that is specific to a user. For example, the supplemental content related to a particular ad in a magazine (for a particular product that is commercially available from a particular store) may be adjusted and/or processed accordingly if, e.g., the user has linked an online account for that particular store to the operation of the supplemental content client. In this example, the user may be able to purchase the particular product with as little effort as one click. For example, the user may be presented with a user-selectable button and/or field labeled, e.g., "buy this item now", that is integrated in the presentation of the requested and received supplemental content, and may be linked to the user's online account.

A supplemental content client may include components used to request supplemental content related to printed content in a publication, such as an image capture device and/or other components described in related application "System And Method For Providing Electronic Supplemental Content Associated With Printed Content In A Printed Publication," filed Jul. 22, 2011. A server may include components to store supplemental content related to printed content in a publication, such as electronic storage and/or other components described in the related application listed above.

As described before, the supplemental content client may operate in conjunction with a server, which may be hosted, provided, and/or administered by an administrator and/or through an administrator network.

A server provides (access to) supplemental content that is related to printed content published in printed publications. Supplemental content may be provided upon request from, e.g., a supplemental content client. It may be assumed that the supplemental content, ultimately, may be accessible through a network connection, e.g. through an Internet connection. A server may include an electronic connection to one or more servers and/or online content providers, an electronic storage, one or more processors, and/or other components. The one or more processors may be configured to execute one or more of an identifier reception module, a content access module, and/or other modules.

The identifier reception module of the server may be configured to obtain an itemized content request that may identify a specific set of printed content. The specific set of printed content may include multiple content items, e.g. an article and several ads for commercially available goods and/or services. In some implementations, the itemized content request may be provided by a supplemental content client.

The content access module of the server may be configured to provide access to the itemized representation content. The content access module may be configured to obtain the itemized representation content, e.g. from a network location. This network location may be a uniform resource locator, and/or another indicator of a network location. The itemized representation content may include multiple user-selectable fields. Individual fields may correspond to individual content items of the specific set of printed content. A field may be associated with particular supplemental content, such that a corresponding content item may be related to the particular supplemental content. The supplemental content may be curated and/or hosted by a supplemental network that may be outside of influence and/or control by either the supplemental content client or the server the itemized content request was transmitted to (which may be part of the administrator network).

The content access module of the server may provide access to the itemized representation content by transmitting a network location from which the itemized representation content may be obtained to, e.g., the supplemental content client from which the itemized content request originated and/or was transmitted. Alternatively, and/or simultaneously, the content access module may provide access to the itemized representation content by obtaining a target transmission destination (e.g. the supplemental content client from which the itemized content request originated) and transmitting (and/or causing to have transmitted) the itemized representation content to the target transmission destination. In this latter case, the content access module may either have direct access to the itemized representation content (which may be stored, e.g. in electronic storage local to the server), or the content access module may obtain the itemized representation content from some electronic storage prior to transmitting it to a supplemental content client.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
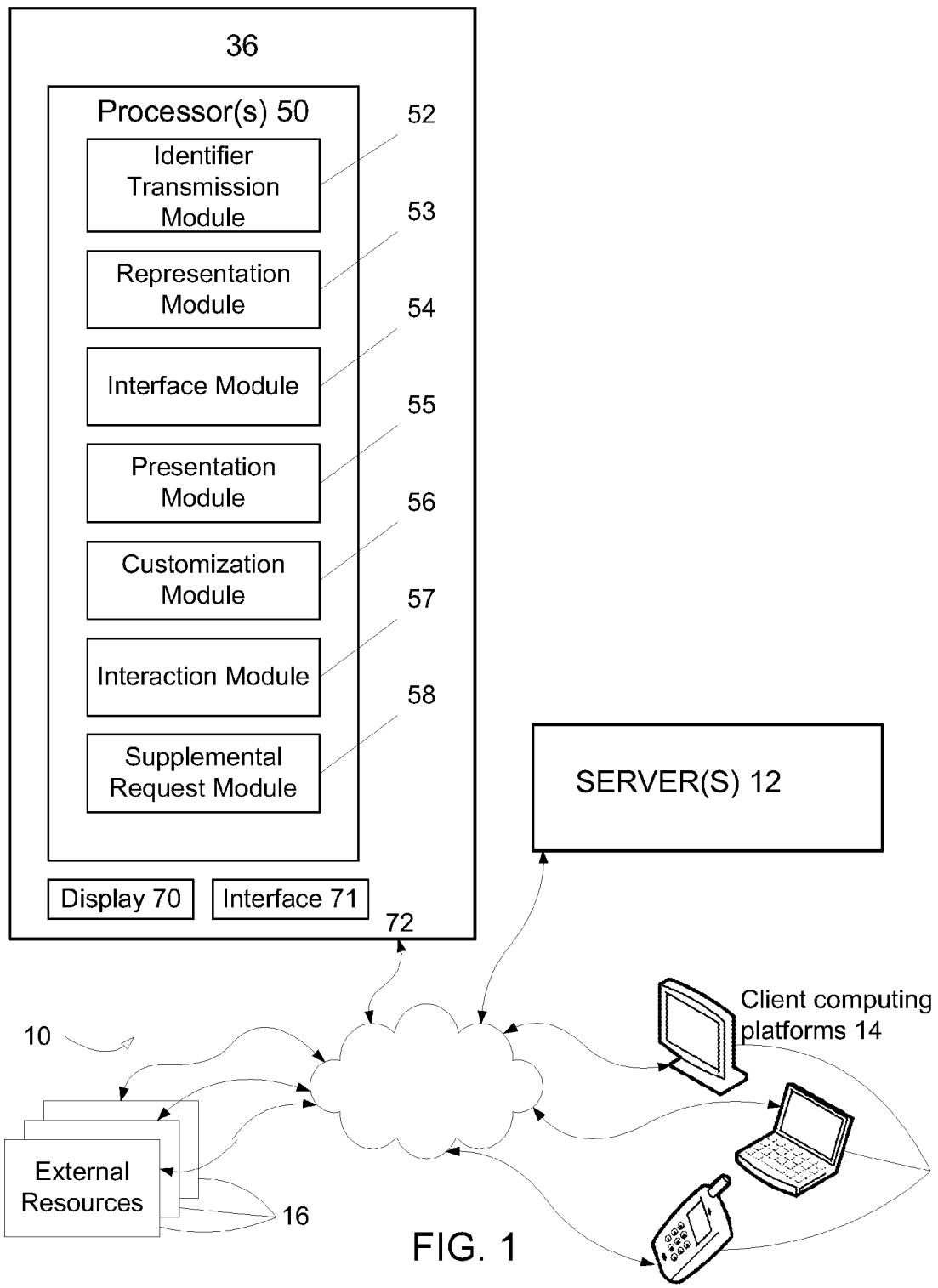
FIG. 1 illustrates a system including a supplemental content client configured to provide, to a user, supplemental content related to printed content in a printed publication.

FIG. 1 illustrates a system 10 configured to provide, to a user, supplemental content related to printed content in a printed publication. The printed content may be organized into sets of content items. A specific set of printed content may include multiple content items one or more of which may be of interest, to the user, to obtain supplemental information about. The printed publications may include one or more of a book, a magazine, a journal, a newspaper, a periodical, a book, a product catalog, a map, and/or other printed publications.

System 10 may include a supplemental content client 36, which may be one of the client computing platforms 14, one or more external resource 16, and/or other components. One or more components of system 10 may be able to exchange information and/or communications via one or more computer networks, including, but not limited to, the Internet.

Supplemental content client 36 of system 10 may include an electronic display 70, an interface 71 capable of receiving a selection from a user, an electronic connection 72 to one or more servers and/or online content providers (e.g. via one or more computer networks), one or more processors 50, and/or other components. One or more processors 50 may be configured to execute one or more of an identifier transmission module 52, a representation module 53, an interface module 54, a presentation module 55, a customization module 56, an interaction module 57, a supplemental request module 58 and/or other modules. Processor(s) 50 may be configured to execute modules 52, 53, 54, 55, 56, 57, and/or 58 via software, hardware, firmware, some combination thereof, and/or through other processor configuration mechanisms.

Identifier transmission module 52 of supplemental content client 36 in FIG. 1 may be configured to transmit an itemized content request for itemized content corresponding to a specific set of printed content. The itemized content request may identify the specific set of printed content (e.g., a page, a story and/or article, an ad and/or information regarding commercial services and/or goods (which may be offered for sale), and/or other sets of printed content that include multiple content items). The specific set of printed content may include multiple content items, e.g. an article and several ads for commercially available goods and/or services. To identify the set of printed content, the itemized content request may include one or more of an image, a machine-readable marker (e.g., a bar code, QR code, and/or other codes), a user-supplied identifier, such as a string of characters entered and/or supplied by a user through an appropriate interface, and/or another identification of printed content.

Figure 3A:
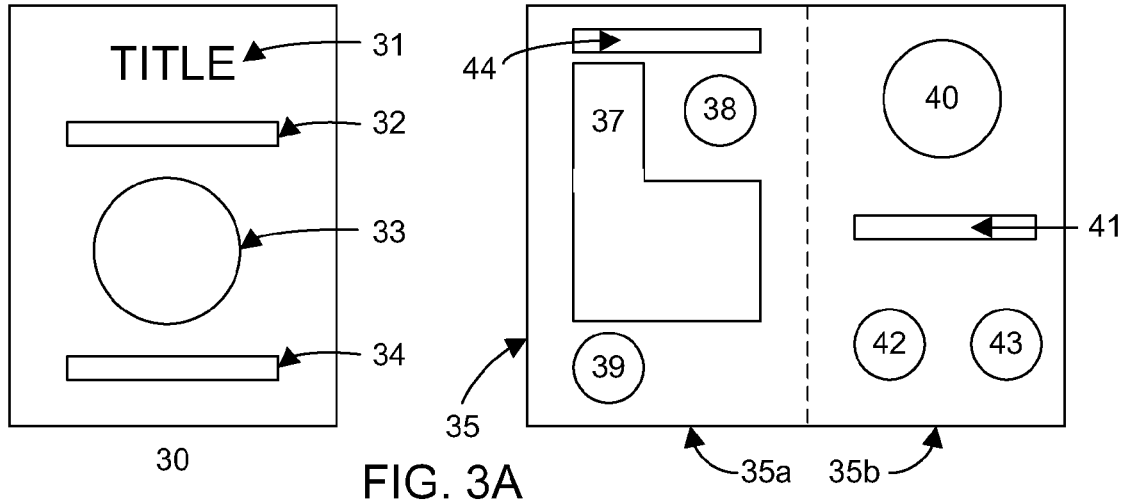
FIG. 3A illustrates exemplary printed content.

By way of illustration, FIG. 3A illustrates exemplary printed content. Cover 30 may be an example of an image of a front cover of a printed publication. Cover 30 may include title 31, cover headline 32 (which may include text), cover picture 33, cover information 34 (which may include text), and/or other elements presented to a reader on cover 30. One or more elements of cover 30 may comprise, individually and/or in combination, an identification that identifies a set of printed content and/or a printed publication. For example, cover information 34 may include a machine-readable marker. Set of pages 35 may include page 35a and page 35b, which may be pages of the same printed publication as cover 30. Page 35a may include headline 44, article 37, ad 38, content element 39, and/or other elements presented to a reader on page 35a. Page 35b may include picture 40, text element 41, ad 42, content element 43, and/or other elements present to a reader on page 35b. One or more elements of set of pages 35 may comprise an identification that identifies a set of printed content (i.e. set of pages 35, page 35a, and/or page 35b) and/or identifies a printed publication, e.g. in combination with cover 30.

An itemized content request transmitted by identifier transmission module 52 of supplemental content client 36 may include an identification of a specific set of printed content, such as page 35b in FIG. 3A, that contains multiple content items.

Representation module 53 of supplemental content client 36 in FIG. 1 may be configured to obtain itemized representation content, e.g. from a network location. The itemized representation may be provided and/or administered to supplemental content client 36, e.g. by an administrator and/or through an administrator network, responsive to the itemized content request being transmitted by identifier transmission module 52. The provision of the itemized content may include a direct transmission from the same server the itemized content request was transmitted to (which may be part of the administrator network), may include a transmission from a different server then the server the itemized content request was transmitted to (such as a third-party server), may include a transmission of a network location (such as a URL) at which the requested itemized content may be accessed, and/or other techniques for providing content and/or access thereto for supplemental content client 36.

The itemized representation content may represent the content items of the specific set of printed content that may be identified by the itemized content request. The itemized representation content may include user-selectable fields such that individual fields correspond to individual content items, and such that a field may be associated with supplemental content that may be related to the corresponding content item. A user-selectable field may include one or more of an image, text, a barcode, audio information, video information, and/or other information. The itemized representation content may be configured as a graphical representation of a specific set of printed content. In other words, the itemized representation content may have a graphical layout, once processed and/or presented, that resembles the graphical layout of the specific set of printed content. The resemblance may pertain to at least one of the commercially available goods and/or services for which information is included in the specific set of printed content, if not all of them. The resemblance may involve one or more of the shape, size, (relative) positioning, layout, (partial) text, (partial) image(s), and/or color of a content item included in the specific set of printed content.

Figure 3B:
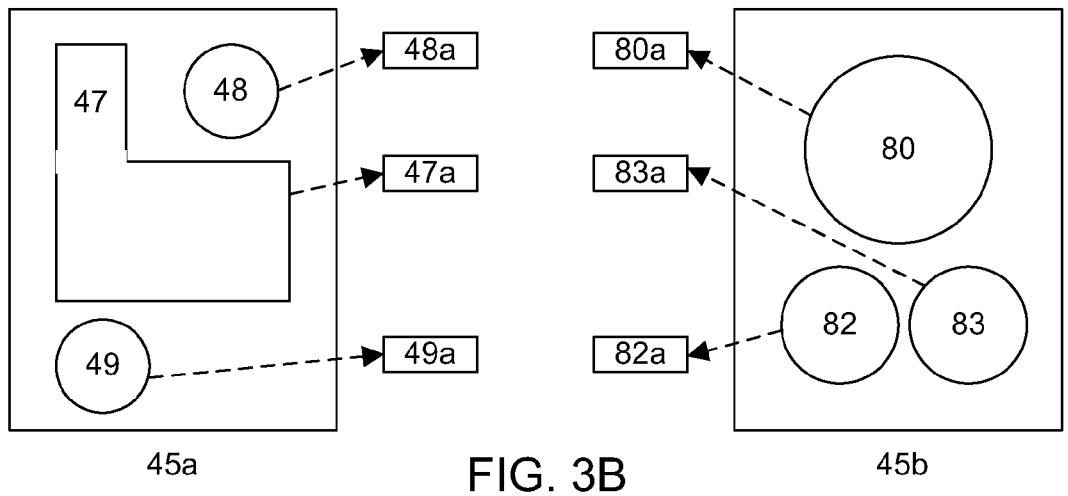
FIG. 3B illustrates exemplary itemized representations of printed content.

By way of illustration, FIG. 3B illustrates exemplary itemized representations of printed content. FIG. 3B includes itemized representation contents 45a and 45b, which may include user-selectable fields such that individual fields correspond to individual content items. Individual fields may be associated with supplemental content that may be related to individual content items. The user-selectable fields of itemized representation contents 45a and 45b may correspond to the printed content of page 35a and page 35b of FIG. 3A, respectively. Itemized representation content 45a may include, among other fields, article field 47, ad field 48, and content field 49, which may correspond to article 37, ad 38, and content element 39 of FIG. 3A, respectively. Itemized representation content 45b may include, among other fields, picture field 80, ad field 82, and content field 83, which may correspond to picture 40, ad 42, and content element 43 of FIG. 3A, respectively. Though itemized representation content corresponds to content items of a specific set of printed content, not all elements/items of a specific set of printed content may correspond to a field of itemized representation content. Note, for example, that headline 44 of page 35a and text element 41 of page 35b, both in FIG. 3A, may not have corresponding user-selectable fields in the itemized content representations of FIG. 3B. Note that the graphical layout of itemized representation contents 45a and 45b may resemble the graphical layout of the printed content of page 35a and page 35b of FIG. 3A, respectively. Such a resemblance may assist the user in selecting the field that corresponds to an individual content item of particular interest to the user, in order to obtain related supplemental content.

Referring to FIG. 1, interface module 54 of supplemental content client 36 may be configured to present itemized representation content, such as itemized representation contents 45a and/or 45b of FIG. 3B, on electronic display 70 of supplemental content client 36. Interface module 54 may be configured to receive a user-selection, e.g. through interface 71, of one or more of the user-selectable fields that are included in the itemized representation content. As mentioned before, the presentation of the itemized representation content may have a graphical layout that resembles the graphical layout of the specific set of printed content. The individual user-selectable fields may be associated with individual ones of the items in the printed content. Selection of a user-selectable field may provide access to the supplemental content, e.g. as described below, which may be obtained from a network location that may be referred to as the supplemental content location. For example, in FIG. 3B, selection of article field 47, ad field 48, or content field 49 may provide access to supplemental article content 47a, supplemental ad content 48a, or supplemental content 49a, respectively. Selection of picture field 80, ad field 82, or content field 83 may provide access to supplemental picture content 80a, supplemental ad content 82a, or supplemental content 83a, respectively. In some implementations, supplemental article content 47a, supplemental ad content 48a, supplemental content 49a, supplemental picture content 80a, supplemental ad content 82a, and/or supplemental content 83a may comprise URLs to supplemental content.

Interface module 54 may be configured to transfer identification information that identifies one or both of the user and/or the host of system 10 and/or server(s) 12 to a supplemental network that curates the supplemental content. In other words, system 10 may be configured to keep track during the current (shopping and/or browsing) session of the user of supplemental content client 36. Alternatively, and/or simultaneously, if the itemized representation content is curated by a proprietary network that is different from the supplemental network that curates the supplemental content, the identification information may identify the proprietary network to that supplemental network. In other words, system 10 may be configured to keep track during the current (shopping and/or browsing) session of the activity encourages and/or enabled through the proprietary network that curates the itemized representation content.

Supplemental request module 58 of supplemental content client 36 in FIG. 1 may be configured to transmit a supplemental content request to server 12. Operation of the supplemental request module may be responsive to receipt of the user-selection of one or more fields that are included in the itemized representation content, as presented, e.g., by interface module 54. The requested supplemental content may be associated with the one or more user-selected fields of the itemized representation content. The supplemental content request may include a supplemental content location, e.g. a URL provided by interface module 54. For example, the supplemental content location may include one or more of supplemental article content 47a, supplemental ad content 48a, supplemental content 49a, supplemental picture content 80a, supplemental ad content 82a, and/or supplemental content 83a as depicted in FIG. 3B. The supplemental content request may be transmitted, e.g., to server 12.

Supplemental content may include, for example, information related to advertisers, individuals, entities, goods, and/or services featured in the printed content, video or audio content, a merchant interface through which products can be purchased, and/or other supplemental content.

Presentation module 55 of supplemental content client 36 in FIG. 1 may be configured to obtain, receive, and/or present the requested supplemental content on electronic display 70 of supplemental content client 36. The supplemental content may be associated with the selected user-selectable field. The supplemental content may be curated and/or hosted by a supplemental network that may be outside of influence and/or control by either supplemental content client 36, server 12, and/or any part of the administrator network. Such a supplemental network may be referred to as a third-party network. For example, the supplemental content may include product and/or service information that is controlled by a publisher (e.g., the publisher that published the printed publication), a store and/or company aiming to sell that product and/or service, or under control of another provider of online content. The supplemental content for a particular content item may include a link, such as a URL, to an online store/marketplace (i.e. a third-party network) where a user might find additional (purchase) information regarding the particular content item. In some implementations, the supplemental content related to a content item may be dynamically adjustable by the third-party network. For example, the same user-selection may lead to a first instance of supplemental content at a first moment in time, and to a second instance of supplemental content at a later moment in time occurring after the first moment in time. The relation itself, rather than merely the supplemental content, may be curated and/or hosted by a third-party network for one or more of the content items. In some implementations, the administrator network may relinquish control over a relation between supplemental content and a content item to a third-party network for a predetermined period of time.

Subsequent to transmission of the supplemental content request (by supplemental request module 58), presentation module 55 may receive transmission of and/or access to the requested supplemental content. The transmission and/or obtainment of the requested supplemental content may provide supplemental content client 36 with access to the requested supplemental content for presentation to the user.

Presentation module 55 of supplemental content client 36 in FIG. 1 may be configured to process the supplemental content for presentation on electronic display 70, before presenting it to the user. Processing may be performed to account for particular characteristics of the current supplemental content client, such as type of platform, operating system version, software version, hardware version, size and/or resolution of the electronic display, available colors and/or fonts on supplemental content client 36, and/or other characteristics of the current supplemental content client that may affect the graphical presentation of information to a user. Alternatively, and/or simultaneously, processing may be performed in accordance with customization settings, user settings, user preferences, user account information, and/or other information that is specific to a user. For example, the supplemental content related to a particular ad in a magazine (for a particular product that is commercially available from a particular store) may be adjusted and/or processed accordingly if, e.g., the user has linked an online account for that particular store to the operation of the supplemental content client. In this example, the user may be able to purchase the particular product with as little effort as one click. For example, the user may be presented with a user-selectable button and/or field labeled, e.g., "buy this item now", that is integrated in the presentation of the requested and received supplemental content, and may be linked to the user's online account.

Figure 3C:
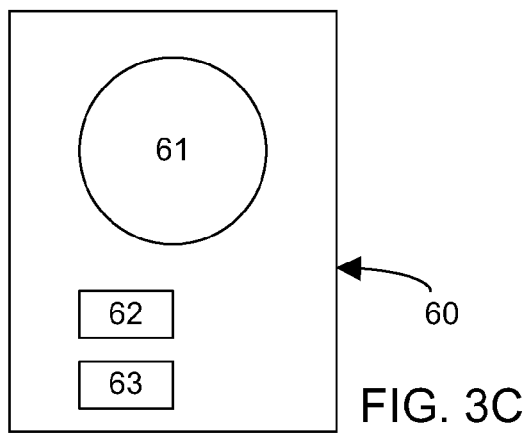
FIG. 3C illustrates exemplary supplemental content.

By way of illustration, FIG. 3C illustrates exemplary supplemental content 60, which may be presented to a user through, e.g., presentation module 55. Supplemental content 60 may include product information 61, product details 62, and purchase button 63, among other elements. Supplemental content 60 may be provided to the user in responsive to transmission of a supplemental content request, e.g. by supplemental request module 58. Product information 61 may be related to a specific content item of a set of printed content in a published publication. For example, product information 61 may be associated with ad field 82 of itemized representation content 45b in FIG. 3B, which may be an ad for a specific product. Product information 61 may include additional information regarding the specific product. In some implementations, supplemental ad content 82a may comprise a URL to supplemental content 60. Product details 62 may include additional information regarding the specific product, such as the purchase price. In some implementations, user-selection of purchase button 63 may initiate a purchase transaction for the specific product.

Customization module 56 of supplemental content client 36 in FIG. 1 may be configured to customize the itemized representation content according to user-specific customization settings. Interface module 54 may be configured to present the customized itemized representation content. For example, customization settings may pertain to individual content items of interest, individual content items not to be included in the itemized representation content, and/or other user preferences. In some implementations, customization settings may function as a filter for which individual content items are to be included in corresponding fields in the itemized representation content. In some implementations, customization settings may function as a preference for certain stores and/or brands if a particular content item may be available from different vendors.

Customization module 56 may be configured to customize the requested and/or obtained supplemental content according to user-specific customization settings, prior to presentation by presentation module 55. For example, customization settings may pertain to user account information for an online account with a particular store, such that the user may purchase an item with as little effort as one click, e.g. on purchase button 63 in FIG. 3C. In some implementations, customization settings may pertain to user preferences such as a graphical theme, color-scheme, or other user preference that may alter the appearance and/or content of the presented supplemental content. For example, supplemental content may be tailored in light of a user's prior purchase history and/or browsing history, e.g. to suggest information and/or product likely to be of interest. For example, the supplemental content could regard shoes, and the user's shoe size (or most recently and/or most often purchased shoe size) may function as a customization setting for the supplemental content.

Interaction module 57 of supplemental content client 36 in FIG. 1 may be configured to receive and/or obtain promotional information. Interaction module 57 may be configured to encourage interaction of a user with particular stores, brands, magazines, publishers, and/or other businesses. The promotional information may be user-specific, and may include ads, (personalized) invitations, sales offers, coupons, and/or other promotional (marketing) material. For example, promotional information may be implemented in a text message, audio message, video message, multi-media message, commercial ad, and/or other means to transfer a communication sent specifically to the user. In some implementations, presentation module 55 may be configured to present the promotional information on electronic display 70 of supplemental content client 36.

Figure 2:
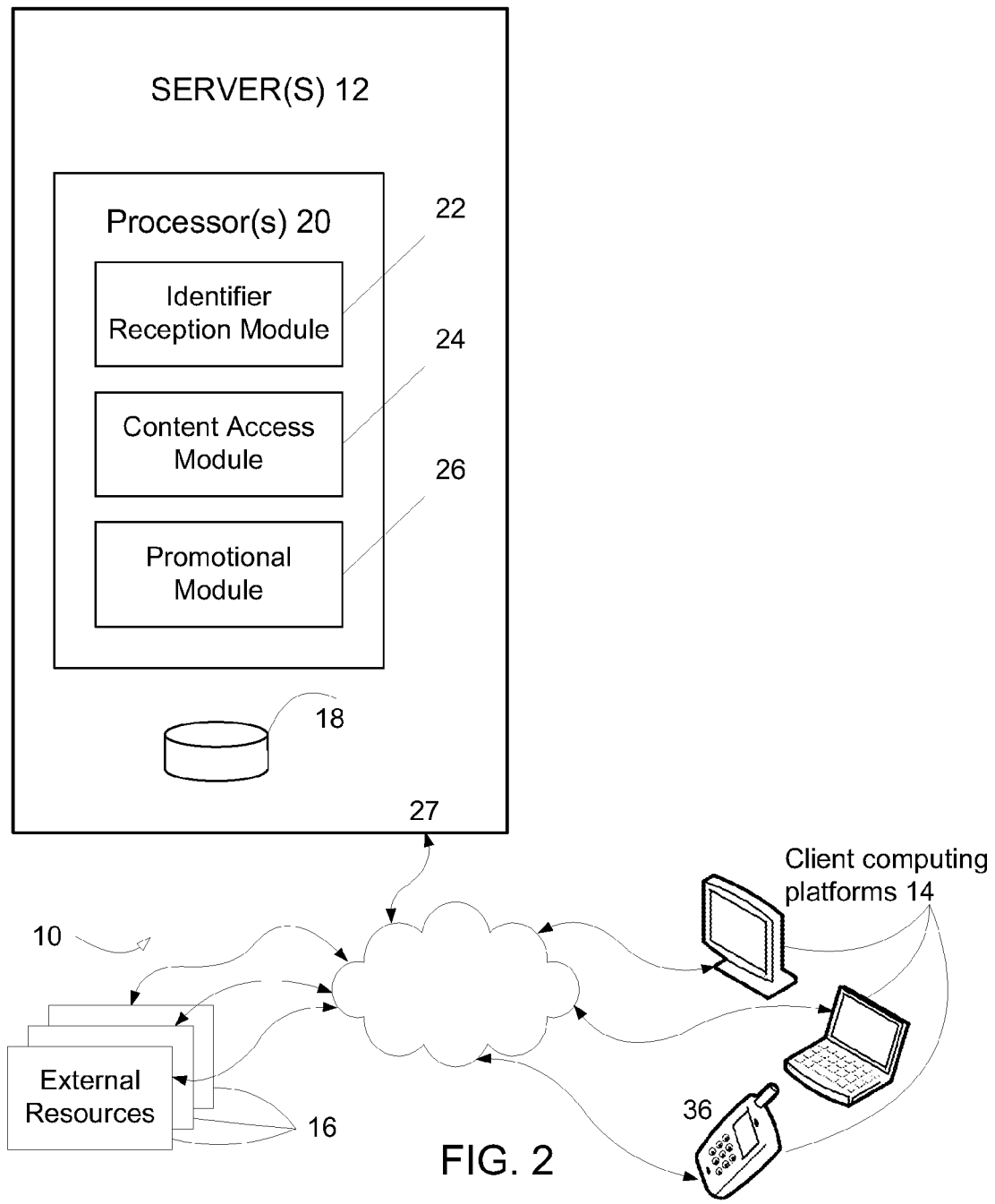
FIG. 2 illustrates a system including a server configured to provide, to a user, supplemental content related to printed content in a printed publication.

FIG. 2 illustrates a system 10 including one or more servers 12 configured to provide, to a user, supplemental content related to printed content in a printed publication. Supplemental content may be provided upon request from, e.g., supplemental content client 36. It may be assumed that the supplemental content, ultimately, may be accessible through a network connection, e.g. through an Internet connection. A server may include an electronic connection 27 to one or more servers and/or online content providers, an electronic storage 18, one or more processors 20, and/or other components. The one or more processors 20 may be configured to execute one or more of an identifier reception module 22, a content access module 24, a promotional module 26, and/or other modules via software, hardware, firmware, some combination thereof, and/or through other processor configuration mechanisms.

Identifier reception module 22 of server 12 in FIG. 2 may be configured to obtain an itemized content request that may identify a specific set of printed content. The specific set of printed content may include multiple content items, e.g. an article and several ads for commercially available goods and/or services. In some implementations, the itemized content request may be provided by supplemental content client 36.

Content access module 24 of server 12 in FIG. 2 may be configured to provide access to the itemized representation content. Content access module 24 may be configured to obtain the itemized representation content, e.g. from a network location. This network location may be a uniform resource locator, and/or another indicator of a network location. The itemized representation content may include multiple user-selectable fields. Individual fields may correspond to individual content items of the specific set of printed content. A field may be associated with particular supplemental content, such that a corresponding content item may be related to the particular supplemental content. The supplemental content may be curated and/or hosted by a supplemental network that may be outside of influence and/or control by either supplemental content client 36, server 12, and/or any part of the administrator network. The supplemental network, or third-party network, may for example be curated by a publisher (e.g. the publisher of the printed publication that includes the printed content related to the supplemental content). In some implementations, the supplemental network may be curated through a network under control of an advertiser and/or an author. Server 12 (and/or any other part of the administrator network) may provide an interface to facilitate management, through a supplemental network, of the supplemental content and/or the relation between supplemental content and content items. Such an interface may e.g. be used to control URLs related to the supplemental content, a location and/or storage of supplemental content, the substance of the supplemental content, and/or any other detail pertaining to the supplemental content.

Content access module 24 of server 12 may provide access to the itemized representation content by transmitting a network location from which the itemized representation content may be obtained to, e.g., supplemental content client 36 from which the itemized content request originated and/or was transmitted. Alternatively, and/or simultaneously, content access module 24 may provide access to the itemized representation content by obtaining a target transmission destination (e.g. supplemental content client 36 from which the itemized content request originated) and transmitting (and/or causing to have transmitted) the itemized representation content to the target transmission destination. In this latter case, content access module 24 may either have direct access to the itemized representation content (which may be stored, e.g. in electronic storage 18 local to the server), or content access module 24 may obtain the itemized representation content from some electronic storage prior to transmitting it to, e.g., supplemental content client 36.

Promotional module 26 may be configured to transmit promotional information to a client computing platform (e.g., supplemental content client 36) for presentation to a user. The promotional information may be implemented in a text message, audio message, video message, multi-media message, commercial ad, and/or other means to transfer a communication intended specifically for the user. Promotional module 26 may cooperate with interaction module 57 of a supplemental content client to promote interaction of a user with particular stores, brands, magazines, publishers, and/or other businesses.

Client computing platform(s) 14 of system 10 in FIG. 1 may include one or more processors configured to execute computer program modules. The computer program modules may be configured to enable an expert or user associated with a given client computing platform 14 to interact with system 10, and/or external resources 16, and/or provide other functionality attributed herein to client computing platforms 14. By way of non-limiting example, the given client computing platform 14 may include one or more of a desktop computer, a laptop computer, a handheld computer, a NetBook, a Smartphone, a tablet, a gaming console, and/or other computing platforms.

External resources 16 of system 10 in FIG. 1 may include sources of information, hosts and/or providers of virtual spaces and/or environments outside of system 10, external entities participating with system 10, external vendors, and/or other resources. In some implementations, some or all of the functionality attributed herein to external resources 16 may be provided by resources included in system 10.

Interface 71 of supplemental content client 36 in FIG. 1 is configured to provide an interface between system 10 and a user through which the user can provide information to and receive information from system 10. This enables data, results, and/or instructions and any other communicable items, collectively referred to as "information," to be communicated between the user and system 10. Examples of interface devices suitable for inclusion in interface 71 include a keypad, buttons, switches, a keyboard, knobs, levers, a display screen, a touch screen, speakers, a microphone, an indicator light, an audible alarm, and a printer. Information is e.g. provided to a user by interface 71 in the form of auditory signals, visual signals, tactile signals, and/or other sensory signals.

By way of non-limiting example, in certain embodiments, interface 71 includes a radiation source capable of emitting light. The radiation source includes one or more of an LED, a light bulb, a display screen, and/or other sources. Interface 71 controls the radiation source to emit light in a manner that conveys to the user information related to the operation of system 10. It is to be understood that other communication techniques, either hard-wired or wireless, are also contemplated herein as interface 71. For example, in one embodiment, interface 71 is integrated with a removable storage interface provided by an electronic storage. In this example, information is loaded into system 10 from removable storage (e.g., a smart card, a flash drive, a removable disk, etc.) that enables the user(s) to customize the implementation of system 10. In some implementations interface 71 may be integrated with electronic display 70, e.g. for a touch-screen display. Other exemplary input devices and techniques adapted for use with system 10 as interface 71 include, but are not limited to, an RS-232 port, RF link, an IR link, modem (telephone, cable, Ethernet, internet or other). In short, any technique for communicating information with system 10 is contemplated as interface 71.

Processor(s) 50 of supplemental content client 36 in FIG. 1 and/or processor(s) 20 of server 12 in FIG. 2 may be configured to provide information processing capabilities in system 10. As such, processor(s) 50 and/or processor(s) 20 may include one or more of a digital processor, an analog processor, a digital circuit designed to process information, an analog circuit designed to process information, a state machine, and/or other mechanisms for electronically processing information. Although shown in FIG. 1 and FIG. 2 as a single entity, this is for illustrative purposes only. In some implementations, processor(s) 50 and/or processor(s) 20 may include a plurality of processing units. These processing units may be physically located within the same device, or may represent processing functionality of a plurality of devices operating in coordination.

It should be appreciated that although modules 52-58 are illustrated in FIG. 1 as being co-located within a single processing unit, in implementations in which processor 50 includes multiple processing units, one or more of modules 52, 53, 54, 55, 56, 57, and/or 58 may be located remotely from the other modules. The description of the functionality provided by the different modules 52, 53, 54, 55, 56, 57, and/or 58 described below is for illustrative purposes, and is not intended to be limiting, as any of modules 52, 53, 54, 55, 56, 57, and/or 58 may provide more or less functionality than is described. For example, one or more of modules 52, 53, 54, 55, 56, 57, and/or 58 may be eliminated, and some or all of its functionality may be provided by other ones of modules 52, 53, 54, 55, 56, 57, and/or 58. As another example, processor 50 may be configured to execute one or more additional modules that may perform some or all of the functionality attributed below to one of modules 52, 53, 54, 55, 56, 57, and/or 58.

It should be appreciated that although modules 22, 24, and 26 are illustrated in FIG. 2 as being co-located within a single processing unit, in implementations in which processor 20 includes multiple processing units, one or more of modules 22, 24, and/or 26 may be located remotely from the other modules. The description of the functionality provided by the different modules 22, 24, and/or 26 described below is for illustrative purposes, and is not intended to be limiting, as any of modules 22, 24, and/or 26 may provide more or less functionality than is described. For example, one or more of modules 22, 24, and/or 26 may be eliminated, and some or all of its functionality may be provided by other ones of modules 22, 24, and/or 26. As another example, processor 20 may be configured to execute one or more additional modules that may perform some or all of the functionality attributed below to one of modules 22, 24, and/or 26.

Electronic storage 18 of server 12 in FIG. 2 may comprise electronic storage media that electronically stores information. The electronic storage media of electronic storage 18 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 18 may include one or more virtual storage resources (e.g., cloud storage, a virtual private network, and/or other virtual storage resources). Electronic storage 18 may store software algorithms, information determined by processor 20, and/or other information.

FIG. 2 illustrates a system 30 configured to provide supplemental content related to printed content to users. This may include automatically identifying the printed content, and providing electronic access to the user for supplemental content that has been associated with the printed content. In some implementations, system 30 may include one or more of electronic storage 32, a server 34, one or more client computing platforms 36, and/or other components.

The electronic storage 32 may be configured to store information related to a set of printed publications. This information may include publication identification information, content images, content identifiers, and/or other information. The publication identification information, content images, and/or content identifiers may be organized in the manner described above with respect to the information stored by system 10 to electronic storage 14 (shown in FIG. 1 and described here). For example, content images representing printed content may be associated with publication identification information for the publications in which the printed content appeared. Content identifiers may be associated with individual content images and/or sets of printed content. The content identifiers may include network locations at which supplemental content associated with the sets of printed content is accessible.

A given client computing platform 36 may include one or more processors configured to execute computer program modules. The computer program modules may be configured to enable an expert or user associated with the given client computing platform 36 to interface with system 30 (e.g., as described herein), and/or provide other functionality attributed herein to client computing platforms 36. By way of non-limiting example, the given client computing platform 36 may include one or more of a desktop computer, a laptop computer, a handheld computer, a NetBook, a Smartphone, a gaming console, and/or other computing platforms.

The server 34 may include one or more processors 48, and/or other components. The server 34 may include communication lines and/or or ports to enable the exchange of information with a network and/or other computing platforms. Illustration of server 34 in FIG. 1 is not intended to be limiting. The server 34 may include a plurality of hardware, software, and/or firmware components operating together to provide the functionality attributed herein to server 34. For example, server 34 may be implemented by a cloud of computing platforms operating together as server 34.

Figure 4:
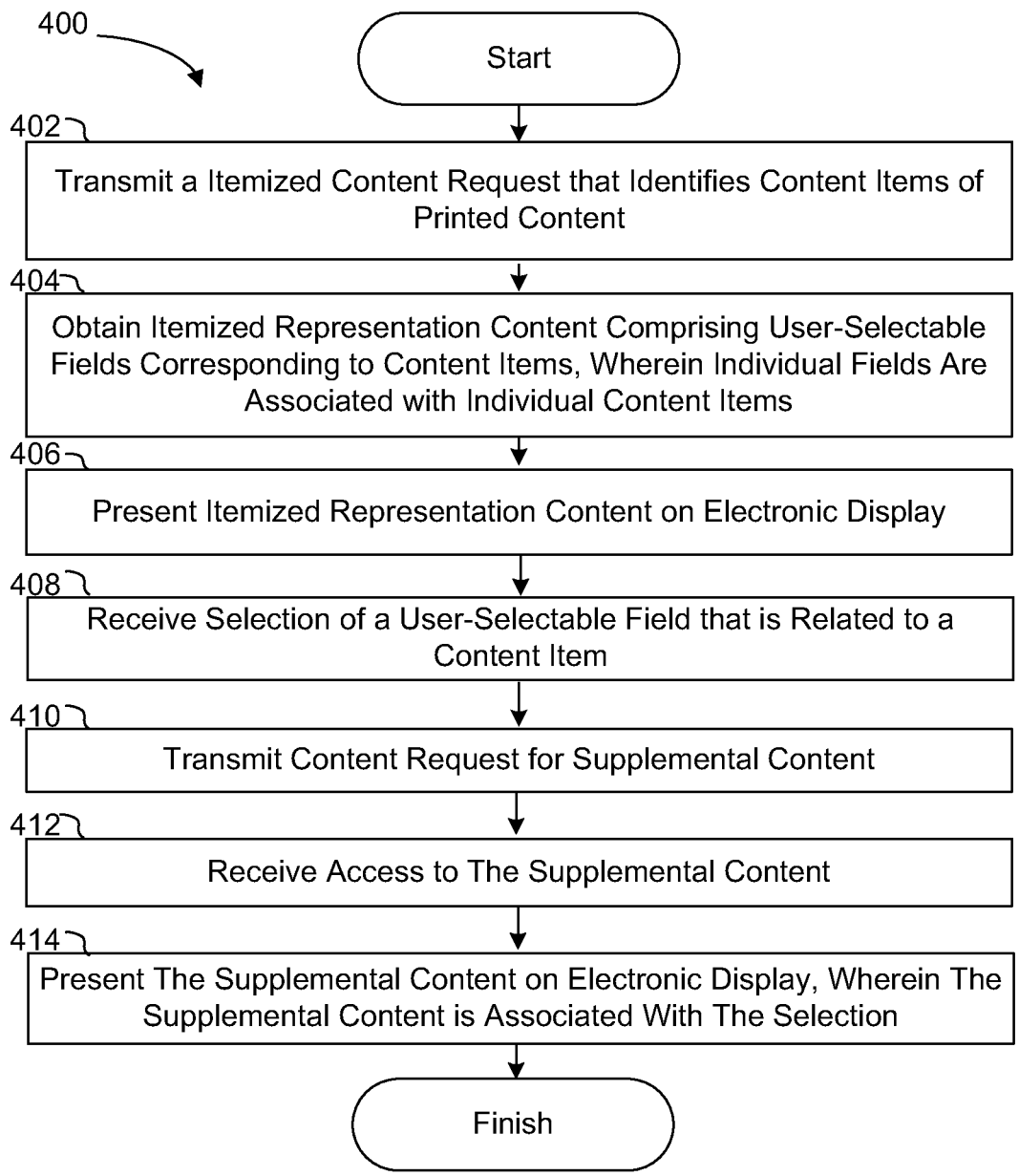
FIG. 4 illustrates a method of providing supplemental content associated with printed content to a user.

FIG. 4 illustrates a method 400 for providing supplemental content related to printed content in a printed publication to a user. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an itemized content request that identifies content items of printed content is transmitted, e.g. by a client computing platform to a server. In some implementations, operation 402 may be performed by an identifier transmission module similar to or the same as identifier transmission module 52 (shown in FIG. 1 and described herein).

At an operation 404, itemized representation content is obtained, e.g. by a client computing platform and from a server, wherein the itemized representation content includes user-selectable fields corresponding to content items. Individual fields may correspond to individual content items of the printed content. In some implementations, operation 404 may be performed by a representation module similar to or the same as representation module 53 (shown in FIG. 1 and described herein).

At an operation 406, itemized representation content is presented on an electronic display. In some implementations, operation 406 may be performed by an interface module similar to or the same as interface module 54 (shown in FIG. 1 and described herein).

At an operation 408, a user-selection of a user-selectable field may be received that is related to a content item. In some implementations, operation 408 may be performed by an interface module similar to or the same as interface module 54 (shown in FIG. 1 and described herein).

At an operation 410, a content request for supplemental content may be transmitted, e.g. from a client computing platform to a server. In some implementations, operation 410 may be performed by a supplemental request module similar to or the same as supplemental request module 58 (shown in FIG. 1 and described herein).

At an operation 412, access to the supplemental content may be received and/or obtained. In some implementations, operation 412 may be performed by a presentation module similar to or the same as presentation module 55 (shown in FIG. 1 and described herein).

At an operation 414, the supplemental content may be presented on an electronic display. The supplemental content may be associated with the selection of a user-selectable field from the itemized representation content. In some implementations, operation 414 may be performed by a presentation module similar to or the same as presentation module 55 (shown in FIG. 1 and described herein).

Figure 5:
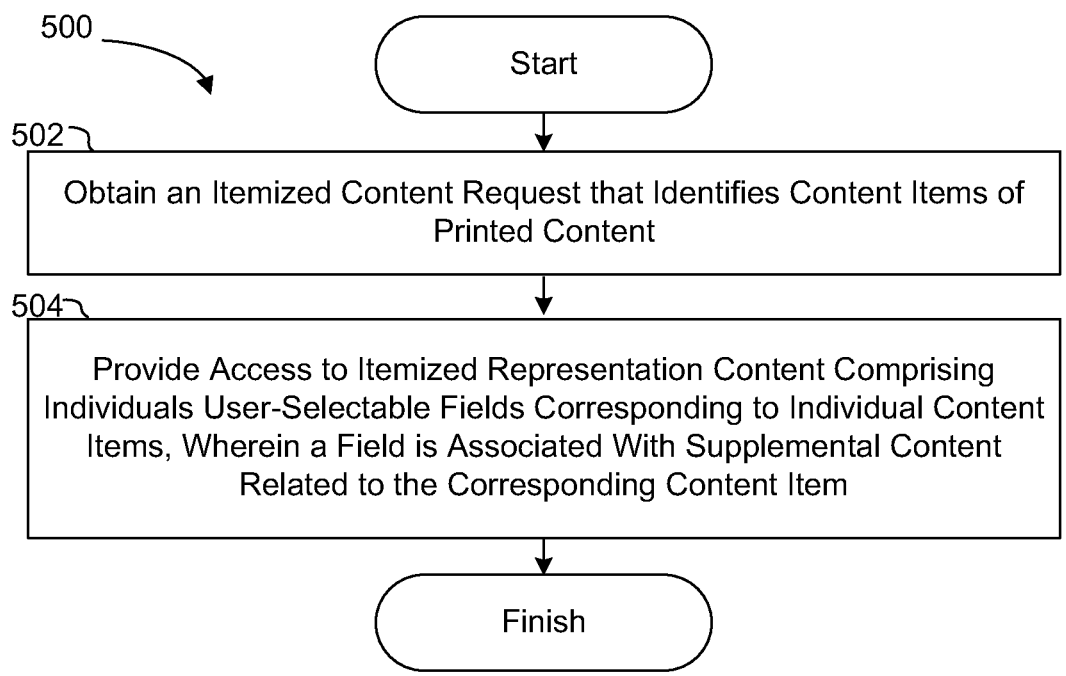
FIG. 5 illustrates a method of providing supplemental content associated with printed content to a user.

FIG. 5 illustrates a method 500 for providing supplemental content related to printed content in a printed publication to a user. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, an itemized content request may be obtained that identifies content items of printed content, e.g. by a server. In some implementations, operation 502 may be performed by an identifier reception module similar to or the same as identifier reception module 22 (shown in FIG. 2 and described herein).

At an operation 504, access may be provided to itemized representation content comprising individual user-selectable fields corresponding to individual content items. A field may be associated with supplemental content related to the corresponding content item. In some implementations, operation 504 may be performed by a content access module similar to or the same as content access module 24 (shown in FIG. 2 and described herein).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide to a user supplemental content related to printed content in a printed publication, the system comprising:
  an electronic display; and
  one or more processors configured to execute computer program modules, the computer program modules comprising:
  an identifier transmission module configured to transmit an itemized content request to a server, wherein the itemized content request includes an image of printed content in a printed publication, wherein the itemized content request identifies a specific set of printed content in the printed publication, wherein the specific set of printed content includes multiple content items;
  a representation module configured to obtain itemized representation content, responsive to transmission of the itemized content request, wherein the itemized representation content comprises user-selectable fields, wherein individual user-selectable fields correspond to individual content items of the specific set of printed content that is identified by the itemized content request, wherein a user-selectable field is associated with supplemental content that is related to a corresponding content item, and wherein itemized representation content has been customized for a user through selection of the user-selectable fields for inclusion in the itemized representation content;
  an interface module configured to present the itemized representation content on the electronic display after the itemized representation content has been customized, wherein the interface module is configured to receive a selection of a user-selectable field of the itemized representation content;

a supplemental request module configured to, responsive to receipt of the selection, transmit a supplemental content request that identifies the received selection of a user-selectable field of the itemized representation content; and a presentation module configured to obtain the requested supplemental content, wherein the presentation module is configured to present the supplemental content on the electronic display, and wherein the supplemental content is associated with the selected user-selectable field that corresponds to the corresponding content item.

2. The system of claim 1, wherein a specific set of printed content comprises an individual page in the printed publication.

3. The system of claim 1, wherein customization of the itemized representation content is dynamic such that, responsive to transmission of the itemized content request to the server at a first moment in time, the itemized representation content includes a first set of user-selectable fields, and, responsive to transmission of the itemized content request to the server at a later moment in time occurring after the first moment in time, the itemized representation content includes a second set of user-selectable fields, the second set of user-selectable fields being different than the first set of user-selectable fields.

4. The system of claim 3, wherein the network location is a uniform resource locator.

5. The system of claim 1, wherein the itemized representation content is configured as a graphical representation of the specific set of printed content.

6. The system of claim 1, wherein the representation module is configured such that obtaining the itemized representation content comprises receiving transmission of the itemized representation content.

7. The system of claim 1, wherein the user-selectable fields include one or more of an image, text, a barcode, audio information, or video information.

8. The system of claim 1, wherein customization of the itemized representation content includes selection of one or more user-selectable fields for inclusion in the itemized representation content such that the one or more user-selectable fields are associated with supplemental content related to one or more preferred stores and/or brands.

9. The system of claim 1, wherein at least one content item included in the specific set of printed content does not correspond to any individual user-selectable fields comprised in the itemized representation content.

10. The system of claim 1, wherein the interface module is configured to present the itemized representation content such that one or more items in the itemized representation content are not presented on the electronic display.

11. The system of claim 1, wherein the supplemental content is curated by a supplemental network, and wherein selection of the user-selectable field transfers identification information that identifies one or both of the user and/or the system to the supplemental network.

12. The system of claim 1, wherein the supplemental content is curated by a supplemental network, wherein the itemized representation content is curated by a proprietary network, and wherein selection of the user-selectable field transfers identification information that identifies the proprietary network to the supplemental network.

13. The system of claim 1, wherein the specific set of printed content includes an informational article that includes text, and wherein the presentation module is configured such that at least a portion of the text of the informational article is not presented on the electronic display.

14. The system of claim 1, further comprising an interaction module configured to receive promotional information, wherein the presentation module is further configured to present the promotional information on the electronic display.

15. The system of claim 14, wherein the promotional information is user-specific.

16. The system of claim 1, wherein association of the selected user-selectable field with the supplemental content is curated by a third-party network.

17. The system of claim 16, wherein the association of the selected user-selectable field with the supplemental content is dynamically adjustable by the third-party network.

18. The system of claim 1, wherein the itemized content request includes one or more of an image of a machine readable marker or a user supplied identifier.

19. A system configured to provide, to a user, supplemental content related to printed content in a printed publication, the system comprising:

one or more processors configured to execute computer program modules, the computer program modules comprising:

an identifier reception module configured to obtain an itemized content request that identifies a specific set of printed content in a printed publication, wherein the itemized content request includes an image of printed content in the printed publication, wherein the specific set of printed content includes multiple content items, wherein the identifier reception module is further configured to identify the specific set of printed content in the printed publication that corresponds to the itemized content request;

a content access module configured to provide access to itemized representation content, wherein the itemized representation content has been customized for a user through selection of the user-selectable fields for inclusion in the itemized representation content, wherein the itemized representation content comprises user-selectable fields, wherein individual user-selectable fields correspond to individual content items of the identified specific set of printed content in the printed publication, wherein a user-selectable field is associated with supplemental content that is related to a corresponding content item, and wherein selection of a user-selectable field initiates obtainment of the associated supplemental content.

20. The system of claim 19, wherein customization of the itemized representation content is dynamic such that, responsive to obtainment of the itemized content request at a first moment in time, the itemized representation content includes a first set of user-selectable fields, and, responsive to obtainment of the itemized content request at a later moment in time occurring after the first moment in time, the itemized representation content includes a second set of user-selectable fields, the second set of user-selectable fields being different than the first set of user-selectable fields.

21. The system of claim 19, wherein the content access module is configured such that providing access to itemized representation content is limited to a subset of the specific set of printed content.

22. The system of claim 19, further comprising a promotional module configured to transmit promotional information to a client computing platform, wherein the promotional information includes one or more of a text message, an audio message, a video message, an invitation, a commercial ad, or a coupon.

23. The system of claim 19, wherein the specific set of printed content includes an informational article that includes text, and wherein at least a portion of the text of the informational article does not correspond to any individual user-selectable fields comprised in the itemized representation content.

24. A method for providing supplemental content related to printed content in a printed publication to a user, the method comprising:
    transmitting an itemized content request to a server, wherein the itemized content request includes an image of printed content in a printed publication, wherein the itemized content request identifies a specific set of printed content in the printed publication, wherein the specific set of printed content includes multiple content items;
    obtaining itemized representation content, responsive to transmission of the itemized content request, wherein the itemized representation content has been customized for a user through selection of the user-selectable fields for inclusion in the itemized representation content, wherein the itemized representation content comprises user-selectable fields, wherein individual user-selectable fields correspond to individual content items of the specific set of printed content, and wherein a user-selectable field is associated with supplemental content that is related to a corresponding content item;
    presenting the itemized representation content on an electronic display after the itemized representation content has been customized;
    receiving a selection of a user-selectable field of the itemized representation content;
    transmitting, responsive to receipt of the selection of the user-selectable field, a supplemental content request for the supplemental content that is related to the corresponding content item;
    receiving the requested supplemental content; and
    presenting, on the electronic display, the received supplemental content associated with the selected user-selectable field that corresponds to the corresponding content item.

25. A method for providing supplemental content related to printed content in a printed publication to a user, the method comprising
    obtaining an itemized content request, wherein the itemized content request includes an image of printed content in a printed publication, wherein the itemized content request identifies a specific set of printed content in the printed publication, wherein the specific set of printed content includes multiple content items;
    identifying the specific set of printed content in the printed publication that corresponds to the itemized content request; and
    providing access to itemized representation content, wherein the itemized representation content has been customized for a user through selection of the user-selectable fields for inclusion in the itemized representation content, wherein the itemized representation content comprises user-selectable fields, wherein individual user-selectable fields correspond to individual content items of the identified specific set of printed content, wherein a user-selectable field is associated with supplemental content that is related to a corresponding content item.

26. The method of claim 25, wherein customization of the itemized representation content is performed dynamically such that, responsive to obtaining the itemized content request at a first moment in time, the itemized representation content includes a first set of user-selectable fields, and, responsive to obtaining the itemized content request at a later moment in time occurring after the first moment in time, the itemized representation content includes a second set of user-selectable fields, the second set of user-selectable fields being different than the first set of user-selectable fields.

27. The method of claim 24, wherein the specific set of printed content includes an informational article that includes text, and wherein at least a portion of the text of the informational article does not correspond to any individual user-selectable fields comprised in the itemized representation content.

* * * * *